(12) United States Patent
Daneshvar

(10) Patent No.: US 10,518,755 B1
(45) Date of Patent: Dec. 31, 2019

(54) DANESHVAR AUTOROTATION MEANS AND METHODS

(71) Applicant: Yousef Daneshvar, W, Bloomfield, MI (US)

(72) Inventor: Yousef Daneshvar, W. Bloomfield, MI (US)

(73) Assignee: AMERICAN MEDICAL CORPORATION

( * ) Notice: Subject to any disclaimer, the term of this patent is extended or adjusted under 35 U.S.C. 154(b) by 123 days.

(21) Appl. No.: 15/727,553

(22) Filed: Oct. 6, 2017

Related U.S. Application Data

(60) Provisional application No. 62/405,198, filed on Oct. 6, 2016.

(51) Int. Cl.
*B60S 13/02* (2006.01)

(52) U.S. Cl.
CPC .................................. *B60S 13/02* (2013.01)

(58) Field of Classification Search
CPC ........................................................ B60S 13/02
See application file for complete search history.

(56) References Cited

U.S. PATENT DOCUMENTS

| | | | | |
|---|---|---|---|---|
| 5,383,757 A * | 1/1995 | Takaoka | ................ | B60S 13/02 414/240 |
| 5,626,079 A * | 5/1997 | Summers | ................ | A47F 5/025 104/44 |
| 5,755,160 A * | 5/1998 | Blufordcraving | ....... | B60S 13/02 104/36 |
| 6,382,106 B1 * | 5/2002 | Knight | .................... | B60S 13/02 104/35 |
| 2003/0101894 A1* | 6/2003 | Schwenker | ............. | B60S 13/02 104/35 |
| 2003/0106454 A1* | 6/2003 | Olbort | .................... | B60S 13/02 104/35 |
| 2003/0233958 A1* | 12/2003 | D'Alessandro, Jr. | ... | B60S 13/02 104/44 |
| 2005/0051046 A1* | 3/2005 | Murdock | ................ | B60S 13/02 104/36 |
| 2006/0230973 A1* | 10/2006 | Nebeker | .................. | B60S 13/02 104/35 |
| 2007/0175353 A1* | 8/2007 | Jeffs | ........................ | B60S 13/02 104/44 |
| 2007/0294957 A1* | 12/2007 | Schwenker | ............. | B60S 13/02 52/65 |
| 2008/0173207 A1* | 7/2008 | Starnes | ................... | B60S 13/02 104/44 |
| 2009/0045312 A1* | 2/2009 | Holt | ........................ | B60S 13/02 248/349.1 |
| 2010/0175578 A1* | 7/2010 | Moore | .................... | B60S 13/02 104/44 |
| 2012/0201649 A1* | 8/2012 | Shen | ........................ | B60S 13/02 414/816 |
| 2013/0078063 A1* | 3/2013 | Shani | ........................ | E04H 6/28 414/253 |

(Continued)

*Primary Examiner* — Jason C Smith

(57) ABSTRACT

Use of cars is part of the modern life. However, many times handling these units are difficult, time and energy consuming. One of such conditions is making a U-turn in a narrow driveway or the end of a narrow valley or street. This invention introduces a method and means which allows a wheeled unit to rotate and make a U-turn in a small place easily. The applicant believes this will make the life of many humans easier.

12 Claims, 11 Drawing Sheets

(56) References Cited

U.S. PATENT DOCUMENTS

| | | | |
|---|---|---|---|
| 2014/0261050 A1* | 9/2014 | Knapp | B61J 1/04 104/47 |
| 2014/0261106 A1* | 9/2014 | Knapp | B61J 1/04 108/139 |
| 2014/0286744 A1* | 9/2014 | Shani | E04H 6/12 414/816 |
| 2014/0291466 A1* | 10/2014 | Amendolea | B60S 13/02 248/349.1 |
| 2017/0282868 A1* | 10/2017 | Mondro | B60S 13/02 |
| 2018/0170324 A1* | 6/2018 | Weiner | B60S 13/02 |
| 2018/0201237 A1* | 7/2018 | Wells | B60S 13/02 |

* cited by examiner

DANESHVAR AUTOROTATION MEANS AND METHODS

This is a non-provisional application requesting the priority of the previous provisional application No. 62/405,198 with filing date of Oct. 6, 2016.

THE BACKGROUND OF THIS INVENTION

Use of automobiles has been part of the modern life. However, many times handling these units are difficult, time and energy consuming. One of such conditions is making a U-turn when needed particularly in a narrow driveway or the end of a narrow valley or street. In these circumstances commonly the driver ends up with turning the car by multiple back and forth moves or driving backward by turning his/her body and neck and shoulders, which has the problems such as limited vision, limited control of the car as well as Neck and shoulder pains. Also it takes more time, uses extra gas, polluting the air and entering the street driving backward which is much more dangerous than driving forward when the vision is significantly more. For these reasons this applicant introduces units which allow a mechanized means to be utilized for rotating the car 180° in a practically smallest surface possible, so that the driver would not need to drive backward and accept the discomfort and risks.

BRIEF EXPLANATION OF THIS INVENTION

This invention introduces an H shaped unit with two parallel channels which allows an automobile to move forward inside those channels, so that the wheels of the automobile to move forward on those channels for the distance about between the front and the rear wheels. This H shaped unit has a center which is attached to the center of the ground/floor which the car moves with use of a rotational means such as horizontal ball bearings, with the vertical rotational axis. So that the H shaped unit can circulate around this central position. The axis which the H shaped unit will rotate is vertical from an up position on the air into the ground or similar. The H shaped unit has a series of wheels which will rotate on the ground. These wheels have either a vertical or a horizontal axis which connects these wheels to the ends of the H shaped base or the body of the H shaped units. In the use of vertical axis, this vertical axis will attach the moving wheels to the body of the H shaped units on a secure and adjustable condition. So that the wheels are under the H shaped units and will be able to tolerate at least one fourth of the weight of the vehicle and still to be able to rotate. With this design the driver would be able to drive into this H shaped unit and then have the H shaped unit rotate 180° so that after the rotation the front of the car will end up to be in the position which the rear of the automobile was located originally. In this position the driver will be able to drive the car forward and leave. A series of controls would be utilized in order to allow the driver or another person to control the rotation of this unit from distance.

DETAILED EXPLANATION OF THE FIGURES

Figure 1:
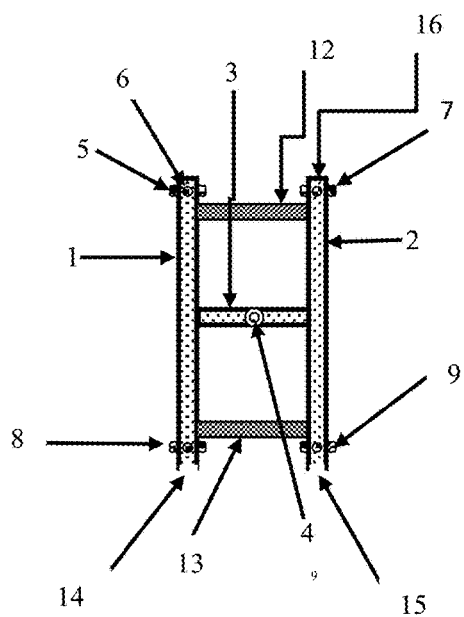
FIG. 1. Shows an H shaped parallel U-shaped channels which are attached to each other by a connecting piece 3. This unit rotates and allows the car to make a U-turn.
Figure 4:
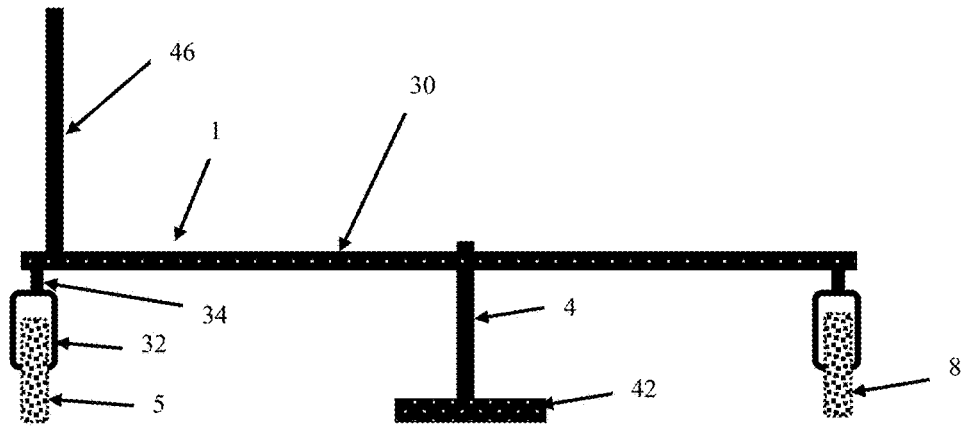
FIG. 4. Shows the side view of the channel 1 which in this view it's vertical rectangular side 30 is shown and the side view of the central pole 4 is shown, attaches to the plate 42.

FIG. 1. Shows an H shaped unit made from two parallel U-shaped channels shown at 1 and 2 which are attached to each other by a connecting piece 3. The U shape figure of these pieces is shown better in FIG. 2. These two parallel pieces are connected to each other by at least one piece shown at 3. Also other pieces of poles or sheets of steel such as units shown in numbers 12 and 13 may be also utilized in order to secure the channels 1 and 2 together firmly. The middle connecting means 3 has a very critical role in this unit since it has a vertical axel 4 going through its center which allows the whole unit to rotate around this axel in a circular fashion. The front and rear ends of the channels 1 and 2 have wheels such as 5, 7, 8 and 9 which have a vertical axis attached to the body of the channels 1 and 2 so that this mechanism allows the H unit to rotate around the center axle 4. Please note the side view of the channel 1 and related vertical axle and the wheel 5 is shown in FIG. 4. Number 6 in this figure shows the position of the vertical axel which connects to the wheel 5. Number 14 and 15 shows an open end of the channels 1 and 2 which allows the front tires of an automobile to enter and move forward on top of the horizontal surface of the channels 1 and 2. A vertical wall shown at 16 may be used to block and will stop the movement of the front wheel beyond this point. A similar block is used in the other side at the end of the U-shaped channel number 1. These vertical blocks will function at will so that by using a horizontal hinge on their base they will open as a gate and let the car to move forward. And they can be closed when another car has to move in and stop.

Figure 2:
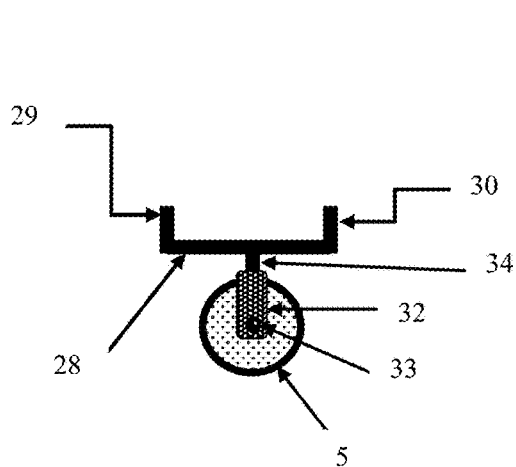
FIG. 2. Shows schematically the side view of the U-shaped channel 1 in a spot which the wheel 5 is attached to it.

FIG. 2. shows schematically the side view of the U-shaped channel 1 in the spot which the wheel 5 is attached to it. This figure shows the U-shaped channel consists of a horizontal floor shown at 28 made from a resilient plate made of steel and it has two vertical walls 29 and 30 respectively. Please note the presence of two vertical walls 29 and 30 will allow the tire of a vehicle to be directed and sit inside this U-shaped unit and be stable. In the lower surface of the floor 28 there is a wheel 5 which is connected to the channel 1 by use of a U-shaped bracket 32 and vertical axel 34. The wheel 5 rotates around the horizontal pin 33. The bracket 32 is attached by a vertical pole 34 to the middle of the floor 28 at that point. Please note that the wheels 7, 8 and 9 are similar to the wheel 5 and are attached to the front and rear ends of the U-shaped channels 1 and 2 exactly in the same relative spots thus this method allows the H-shaped unit to rotate on the ground around the central vertical 4 exactly on the same circular route. The piece 3 has a hole which allows a vertical pole 4 to go through so that finally the channels 1 and 2 to rotate around the central axle 4 as designed.

Please note that when used with the parallel channel 2 only the lateral wall 29 may be needed and the medial wall 30 can be eliminated.

Figure 3:
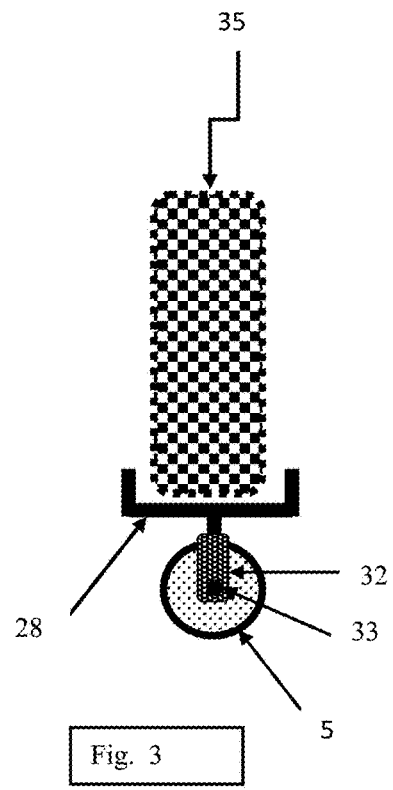
FIG. 3. Shows the side view of the U-shaped channel 1 shown in previous FIG. 2 which is hosting a front tire shown at number 35.

FIG. 3. Shows schematically the side view of the U-shaped channel 1 shown in FIG. 2 which is hosting a front tire shown at number 35. Please note that this tire is sitting on the upper surface of the horizontal sheet 28 from the channel number 1 from the H shaped unit shown in FIG. 1. Please note the vertical side walls shown at 29 and 30 from the previous FIG. 2 will prevent the tire from exiting the upper surface of this channel.

FIG. 4. Shows schematically the side view of the channel 1 shown in previous FIG. 1. In this view the vertical rectangular side wall 30 is shown and the side view of the central pole/Axel 4 is shown which is securely attached to the center of the sturdy horizontal plate 42 which securely attached to the ground and will prevent the pole 4 from moving to sides or dislodgment. Importantly please note that although in this figure it appears the pole 4 is attached to the channel 1 but in fact it is not and it is attached to the plate 3 which is shown in FIG. 1. This figure shows the wheel 5 connected to the lower end of a U-shaped bracket 32 by a pin which goes horizontally from the center of the wheel 5 and allows the wheel 5 to rotate around the pin. The bracket 32 is attached by a vertical pole 34 to the floor of the channel 1. Also in this figure the wheel 8 is shown which attaches to the rear end of the channel 1 by the same method.

Figure 5:
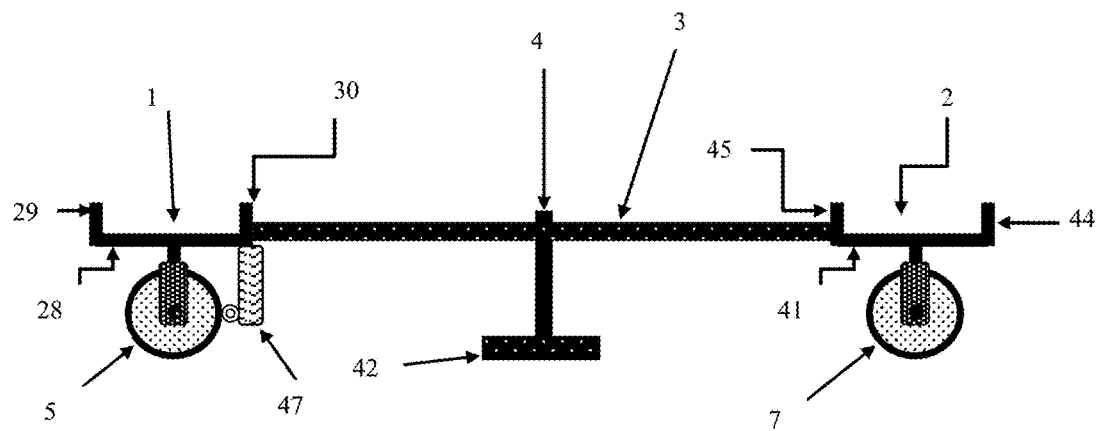
FIG. 5. Shows the front view of the unit shown at FIG. 1. In this view the side views of both Channels 1 and 2 are seen.

FIG. 5. Shows schematically the front view of the unit shown at FIG. 1. In this view the side views of both Channels 1 and 2 are seen showing their U-shaped body with horizontal floors shown at 28 and 41 respectively. The channels 1 and 2 have vertical side walls shown at 29 and 30 for the channel 1 and 45 and 44 for the channel 2. Each channel has a front wheel shown at 5 for channel 1 and 7 for channel 2 respectively which are attached to the lower surface of the horizontal floors of these channels shown at 28 and 41 respectively. The side view of the horizontal sturdy rectangular plate 3 which was also shown at FIG. 1 is shown here as well. This unit 3 is made of a strong material such as steel and attaches the center of the medial walls 30 and 45 of the channels 1 and 2 at ends of unit 3. The attachments of the channels 1 and 2 with the unit 3 makes the H shaped unit, as seen in FIG. 1. The very center of this rectangular plate 3 has a hole which allows a vertical pole/axel 4 to go through. The lower end of the pole 4 is securely attached to the center of a sturdy plate 42. This view also shows two wheels 5 and 7 which are connected to the lower surface of the front of the floor 28 from Channel 1 and 41 from channel 2. Please note such construction and mechanism allows the H shaped unit shown in FIG. 1 to rotate around the central pole/axel 4 which is attached to the center of the sturdy, secure plate 42 which is securely attached to the ground by various means such as screws or similar and prevents the pole 4 from moving or being dislodged. This mechanism allows the plate 3 and eventually the channels 1 and 2 to rotate around the center pole/axel 4 with the least possible variation. Importantly please note in three-dimensional plane the plate 3 is attached to the middle of the length of the channels 1 and 2 which cannot be seen in this view. Aaa FIG. 6. Shows schematically the top view of a circular channel designed for allowing the wheels of the H shaped unit shown in FIG. 1 to stand on top of this horizontal unit and rotate with ease and security. Importantly, per design the wheels of the H shaped unit shown on FIG. 1 will be placed on top surface of a horizontal, smooth and sturdy path for being able to rotate properly, securely and with ease. For this reason such a circular channel is designed and its main body shown at 18. The center of this circular unit is shown at 21. This circular channel allows the wheels 5, 7, 8 and 9 from the H shaped unit shown at FIG. 1 to sit on the upper surface of this circular channel and rotate by having the lower end of the vertical pole/axel number 4 which is fixed exactly in the center 21 of this circular sturdy channel. The outer wall of this circular channel is shown at 19 and the inner wall of the channel shown at 20. The sturdy fixed, bars 22 and 23 attach to the inner wall of the circular channel for holding this unit securely in place and prevent it from movement, disfiguring and similar. Importantly, this figure also shows four circular bases shown at 24, 25, 26, and 27 which are designed for holding and securing the circular channel on the ground. Importantly, they also play a role for the adjustment of the position of the circular unit 18 in order for making this circular unit 18 to be in a horizontal position for allowing the wheels of the H shape unit shown at FIG. 1 to rotate inside this circular channel with security and ease. So that the rotation of the wheels of the unit shown at FIG. 1 will be secure, and without unwanted movements, since the weight of the whole vehicle will be transmitted by wheels on top of the floor 18. The side view of these bases and the related parts are shown in FIG. 7.

Figure 7:
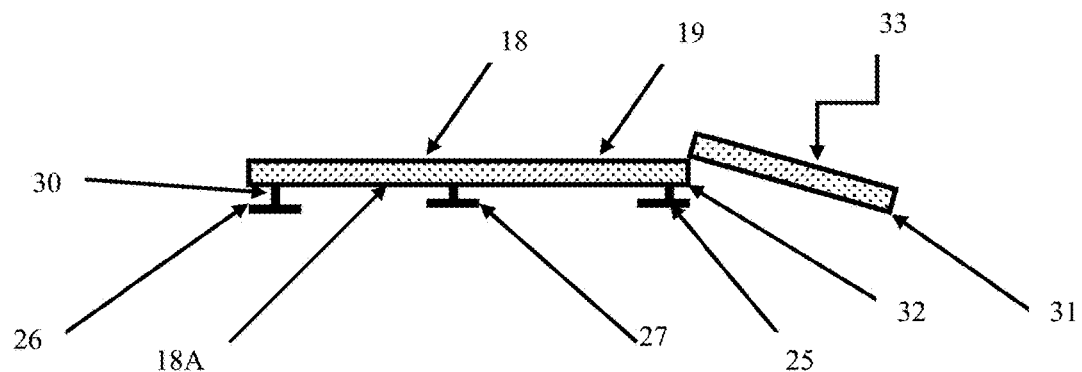
FIG. 7. Shows the side view of the circular channel 18 shown at FIG. 6. In this figure the outer wall of the channel 18 is shown at 19 and the lower surface is shown at 18A.

FIG. 7. Shows schematically the side view of an adjustable circular channel 18 shown at FIG. 6. In this figure the outer wall of the channel 18 is shown at 19 and the lower surface of the base of this channel is shown at 18A. This circular channel has four stabilizing adjustment means which only three of them are seen in this figure shown at 26, 27, and 25. This stabilizing adjustment means have a lower relatively flat horizontal body one of them shown at 26 which is attached to the lower surface of the circular channel here shown at 18A by an adjustable pole shown at 30. The adjustable pole 30 and similar units are designed for allowing the level of the base 18A of the unit 18 to be adjusted so that finally the unit 18 to be in an exact horizontal level in order to allow the wheels of the H shaped unit shown at FIG. 1 to circulate on its upper surface easily, and securely. Note the numbers and makeups of such stabilizing units may vary depending to the size of the unit 18 as well as the ground structure which the bases 24, 25, 26 and 27 are to be placed. For example the wheels of the H shaped unit may or rotate on top of the concrete of the ground if the concrete is sturdy and in horizontal condition, and properly made with smooth concrete surface. Otherwise the base of the units shown at 24, 25, 26 and 27 can be placed on the ground made of gravel so that by adjustment of these units the surface 18 of the circular base can be adjusted. Importantly note, that the final outcome has to make the unit 18 to be in a secure, sturdy horizontal level for use. A channel shaped ramp shown at 33 has a street-level entrance 31 which will stay on the street surface and allow the front wheels of the incoming automobile to move inside and continue to reach the upper surface of the channels 1 and 2 from the H shaped unit shown in FIG. 1. Note the second end of the floor of this channel 33 will match the upper surface of the channels 1 and 2 so that the movement of the automobile from this ramp to the channel 1 and 2 to be possible and in smooth fashion. This ramp may be hinged to the body of the circular unit 18 in the proper spot. Note this ramp would be either a wide ramp or consisting of two parallel ramps so that each one will match and allow the wheels of the automobile to move from each one of these ramps to the rear end of the channels 1 or 2. Importantly note, multiple electrical or electronic controls may be used in order to allow the movement of the H shaped unit 1 and 2 to be safe for example the control will allow this unit only to rotate when the vehicle is situated on its top, to prevent it from moving if no vehicle is on its top. This is a safety measure to prevent from abuse and accident. Also following units may be used with these units. Bbb A. The H shaped unit may have a vertical pole attached to channels 1 or 2 or both for allowing the H shaped unit to be rotated manually. Such a pole is shown at number 46 at FIG. 4, and FIG. 8A.

B. Electrical engines may be attached directly or indirectly to the wheels such as wheel 5 and or wheels 6, 7 and 8 or even can be independent of these wheels in order to have them rotate electrically. One such example is shown at the unit 47 at FIG. 5 which has a rotating smaller wheel touching the wheel 5 so that the electrical engine will eventually rotate the wheel 5 at the direction desired. These engines will have electrical or electronic control means. Importantly note that the placement of electrical engine is not limited for being attached to the wheels but it can be modified or chosen to be either on the platform that the vehicle stands old on the floor which the platform stands either way and electrical system with elected recall or electronic control in order to rotate the vehicle as desired and needed.

C. The unit may use control means with slots or means for inserting money or tickets in order to start the rotation of the H tape unit, so that the user will participate in the expense of making such units in the city. An example shown at number 60 at FIG. 9.

Figure 8:
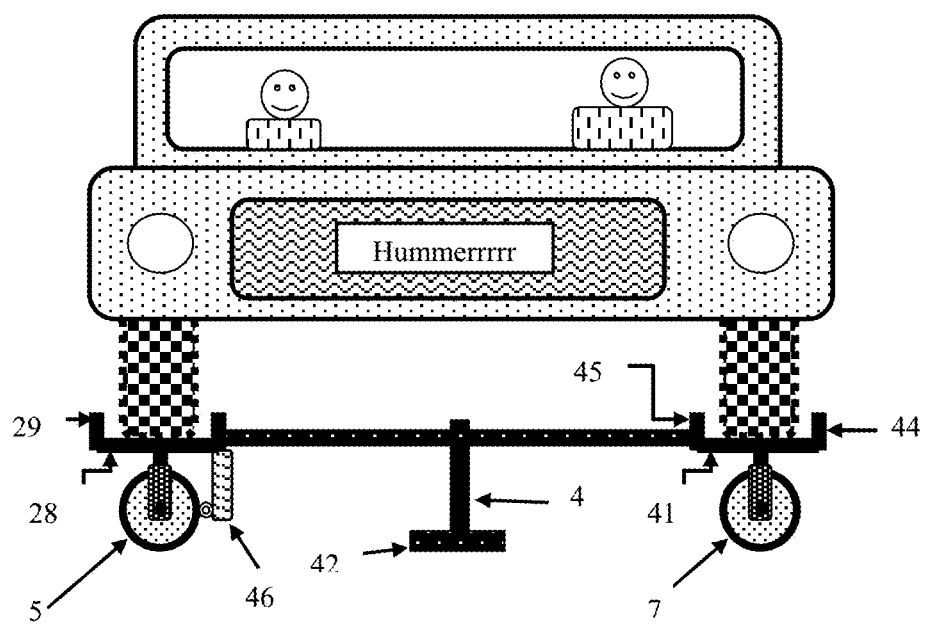
FIG. 8. Shows the front view of the channels 1 and 2 with a car moved on its top. The front wheels of the car are sitting in front of the channel 1 and 2.

FIG. 8. Shows schematically the front view of the channels 1 and 2 with a vehicle sitting on its top. The front wheels of the car/Auto/vehicle are sitting in front of the channel 1 and 2. This figure also shows a schematically an electrical engine shown at 46 which has a wheel and will be engaged to rotate the wheel 5 by its electrical power. This figure is shown for giving the idea of how a Vehicle will be positioned on top of the channel 1 and 2. And it is schematically illustrating that an electrically powered motor could be utilized for moving the wheels of the H shaped unit. This can be done by utilizing the present mechanical and technical science, in multiple fashions and methods and using different means. ccc FIG. 8A. Shows schematically the side view of a unit similar to one shown in FIG. 8. In this figure the side view of channel 1 can be seen with a car on its top with its left side wheels sitting on channel 1. This figure also shows handle 46 which allows the whole unit to be rotated on a circle with the center shown at pole/axel 4. This figure is also shown to give an idea of how the car will be positioned on top of the channel. Importantly note this size of the channels will be designed to accept various automobiles which will use this unit.

Figure 9:
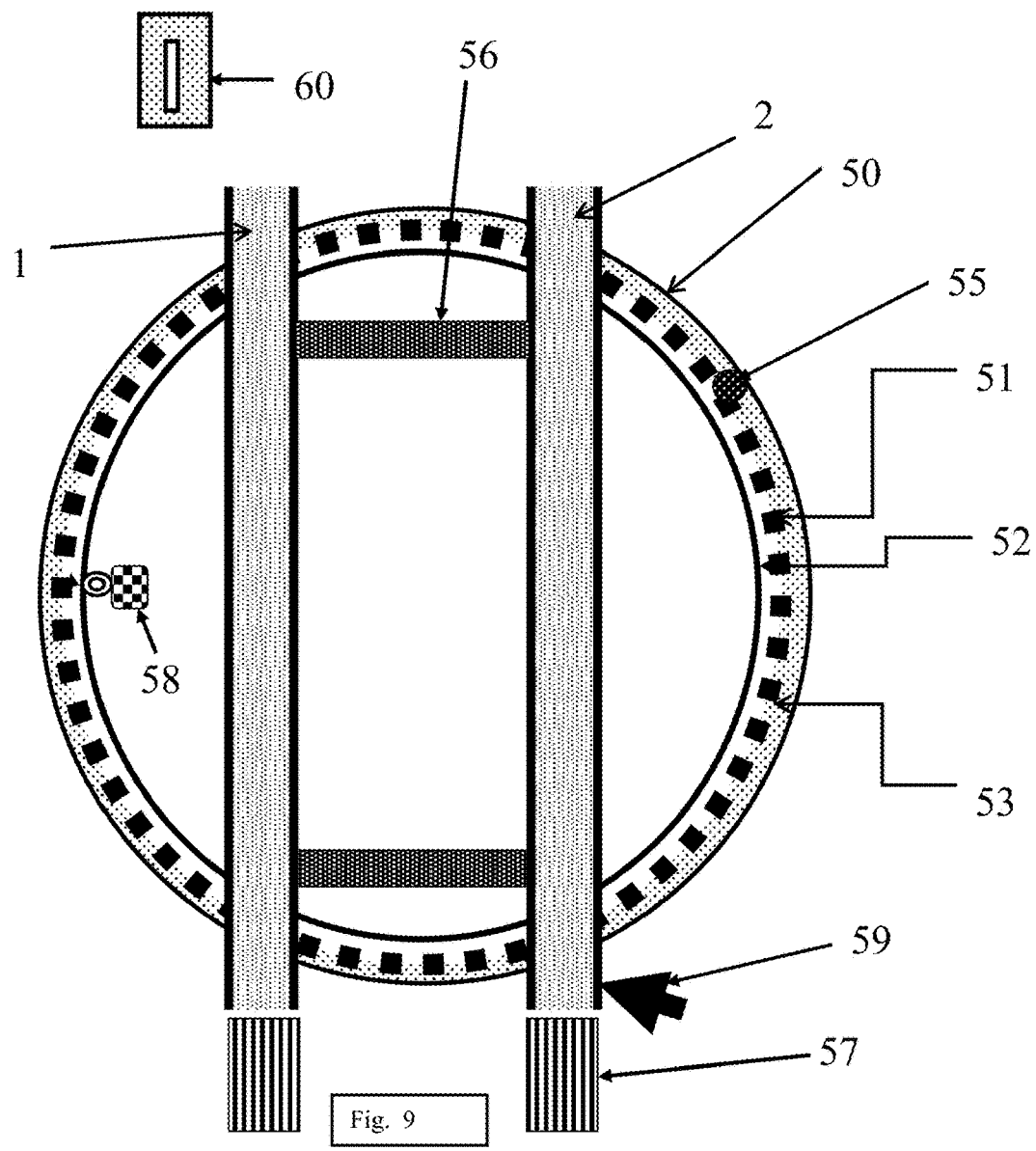
FIG. 9. Shows two parallel U-shaped channels shown at 1 and 2 which are attached to the top of a circular means which is capable of allowing them to rotate around the center of the circular means.
Figure 10:
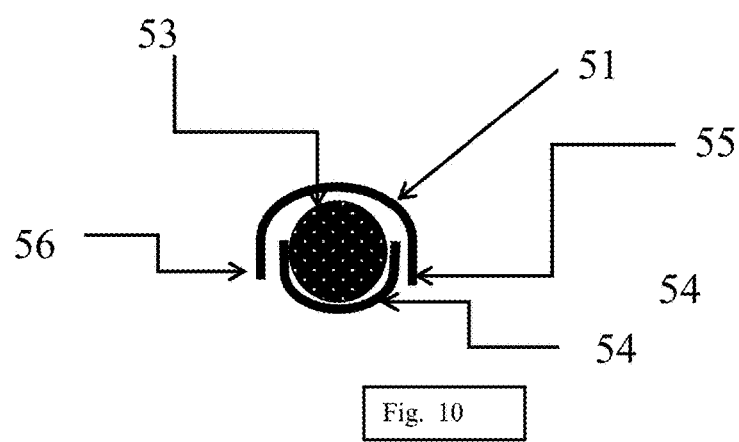
FIG. 10. Shows the cross cut side view of the circular unit shown in previous FIG. 9.

FIG. 9. Shows schematically two parallel U-shaped channels shown at 1 and 2 which are attached to the top of a circular means which is capable of allowing them to rotate around the center of the circular means. Please also note the cross cut view of such circular means which is shown at FIG. 10 as well. These two circular means consists of two matching circular shaped pieces which the first one 51 which (the opening of its U-shaped cross cut is toward the ground) sits on the top of the second circular means 54 (which it's opening of the U-shaped unit looking to the ceiling or sky) located in the bottom. These two circular means are made from a mechanically strong material such as steel. Please note the singular unit 51 simply overlaps the The engineering of these units allows the upper circular means 51 to overlap the lower circular over circular unit means 54. The circular unit 54 also is made from a mechanically strong material such as steel mechanical and technological knowledge of engineering are utilized for making these parts to have the shape, sizes, thickness resilience and other factors in order to function as required for such function and purpose. Therefore there would be an almost a tunnel between these two U-shaped overlapping circular units 51 and 54, so that with adding needed numbers of globe shaped sturdy bearings made from the steel or man-made materials, the top U-shaped unit will move on top and around the lower U-shaped circular channel, with the least possible friction, having liquid oil or similar will facilitate such movement. Thus there are multiple globe shaped bearings made from steel or other proper man-made material with very smooth outer surface which will facilitate the movement of the upper circular means 51 compared to the lower circular means 54 without significant resistance, similar to the method used for making bearings. Two U shaped channels 1 and 2 are attached firmly in parallel position to each other and with the exact same distance from the center of the circular means to the upper surface of the circular means 51. At the time of use the bottom circular means 54 would be located on the ground and will be adjusted so that it would be firm on the ground and also in a very horizontal situation. Therefore the upper circular means 51 will be also in a very horizontal position. This horizontal position will be also translated to the two U-shaped channels one and two. The presence of these two U-shaped channels 1 and 2 will allow an automobile to move with its tires on the top of surface of these channels so that the left tires will be situated on the flat surface of the channel 1 and the two right side tires will stay on top of the channel 2. a vertical pole shown at 55 allows the user to circulate the upper circular means 51 to rotate easily on top of lower circular means 54 therefore the user is able to rotate the automobile for about 180° easily so that the car can make the U-turn with much less effort. This figure also shows optional strong pieces of steel such as one shown at number 56 to attach the U-shaped unit 1 and 2 together for making a sturdier unit. A similar piece is shown in the lower part of this figure attaching the lower part of the U-shaped channel 1 and 2 together. ddd FIG. 10. Shows schematically the cross cut side view of the circular unit shown in previous FIG. 9. In this figure the upper U-shaped channel is shown at 51 and the lower U-shaped circular unit is shown at 54 and the ball bearing shown at 53. Please note this design allows the upper U-shaped circular unit 51 to rotate compared to the lower U-shaped circular means 54 when they are in horizontal position. Please also note that importantly per design the lower walls of the upper circular unit shown at 55 and 56 overlap the sidewalls of the lower U-shaped circular means 54. This design will prevent from moving objects such as flying papers, plastics, leaves and particles such as dust from reaching the inner space of this unit and the balls, thus when compared to an open space this unit will have far less problems and the need for maintenance.

Figure 11:
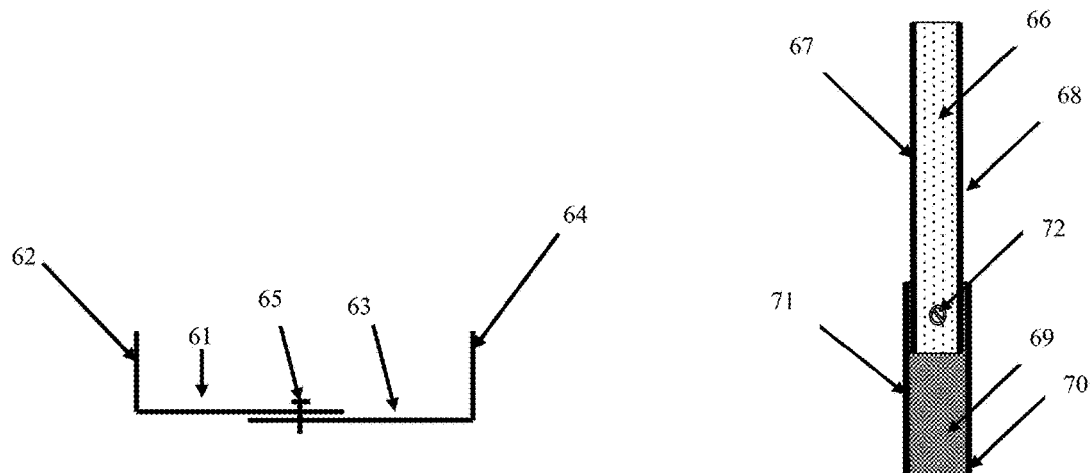
FIG. 11. Shows the side view of an adjustable U-shaped channel which consists of two matching L shaped pieces which are overlapping their lower surface and are fixed to each other by screw 65.

FIG. 11. Shows schematically the side view of an adjustable U-shaped channel which consists of two matching L shaped pieces which are overlapping their lower surface and are fixed to each other by screw 65. Please note one L shaped piece is made from a horizontal sheet 61 with its vertical wall 62 and the matching part is made from combination of horizontal sheet 63 joined by the vertical part 64. This mechanism allows the width of an H-shaped channel to be adjusted to make it wider for the vehicles which have wider tires and shorter for those automobiles which have narrower tires. Naturally in public places the width of the U-shaped channels would be chosen to be wide to accommodate most of the cars. Importantly also the length of long parts of this H shaped channels can be also made from two or more pieces which will overlap each other and can be attached to each other by means of screws or welding in order to make different size units. Such adjustability will allow the length of those pieces to be adjusted and finally a unit to be made to fit the need of the user.

Figure 12:
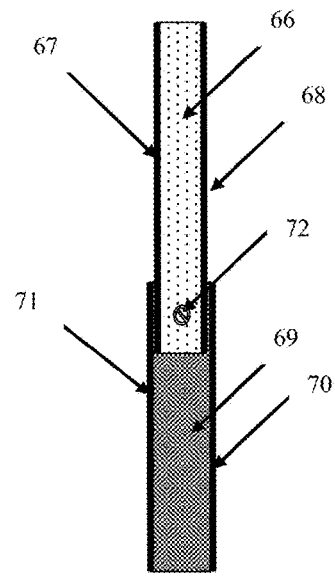
FIG. 12. Shows the top view of an adjustable U-shaped channel which consists of two matching U-shaped channels screwed together.

FIG. 12. Shows schematically the top view of an adjustable U-shaped channel which consists of two matching U-shaped channels which the first one slides inside the second piece and a series of screws fix them together. Therefore the length of the final unit will be adjusted. In this figure the first channel has the flat surface shown at 66 and two vertical walls shown at 67 and 68. The second U-shaped channel is shown at 69 with vertical walls 70 and 71. The screw 72 allows these two units to be fixed to each other. Therefore, the methods shown at FIGS. 11 and 12 allow the width and length of a U-shaped channel to be adjustable. A similar unit will allow the middle attachment unit shown at 3 and other pieces in FIG. 1 to be adjustable as well.

Figure 13:
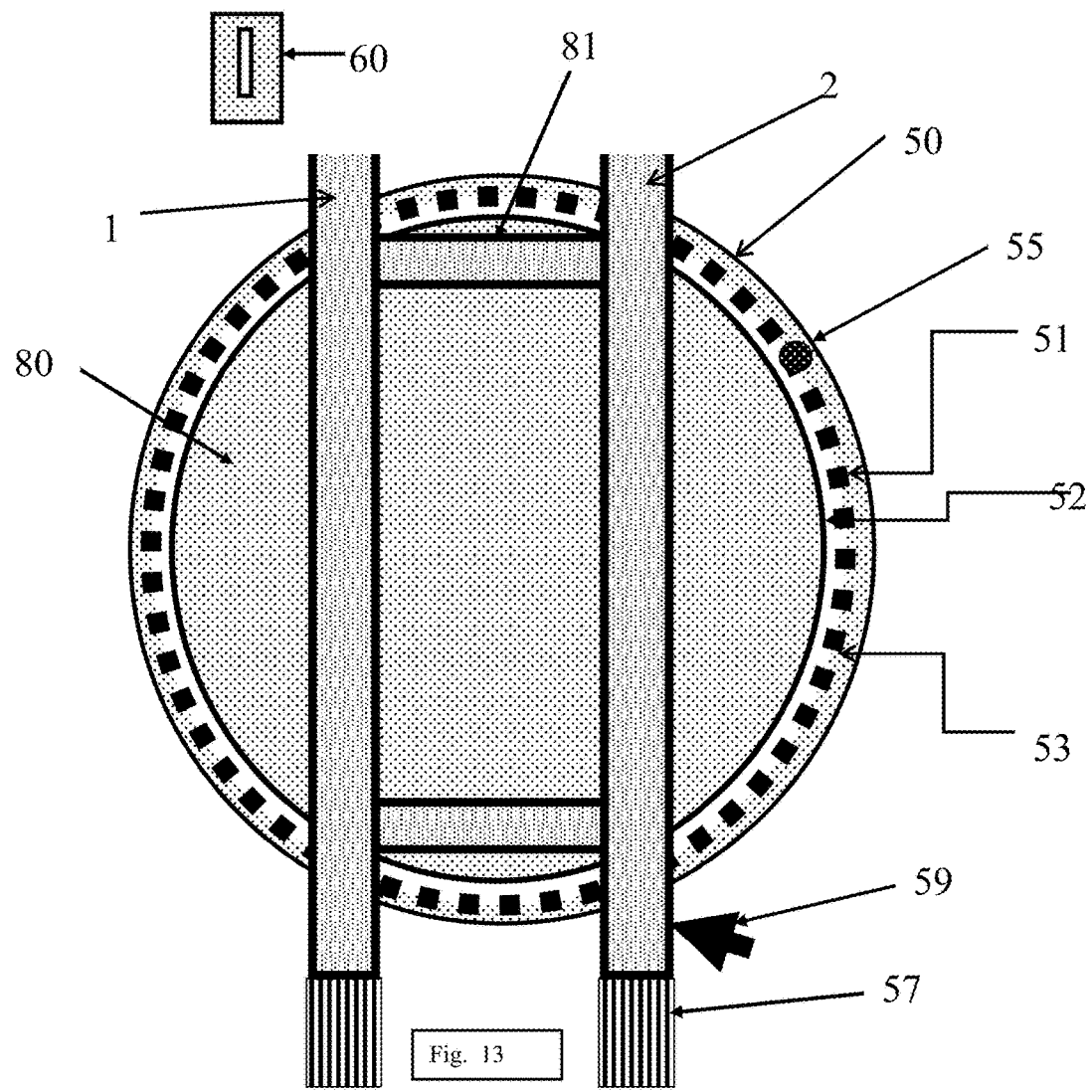
FIG. 13. Shows the top view of a circular means similar to the unit shown at FIG. 9 except in this model a cover sheet made of steel shown at 80 is being attached to the inner wall 52 and the sides of the H shaped channel.

FIG. 13. Shows schematically the top view of a circular means similar to the unit shown at FIG. 9 except in this model a cover sheet made of steel shown at 80 is being attached to the inner wall 52 and it also attaches to the sides of the H shaped channel in order to cover the spaces between the H shaped unit and circular unit for preventing from objects falling under this cover. The purpose of making such covers are:

1. For making the unit safe for the pedestrians who may walk in the area which this unit is installed. It will prevent children to play between the H shaped channels and run into accidents.
2. This unit will shield this unit from moving objects such tree leaves, papers, plastics and other particles from moving's in spaces between the H shaped units. Therefore it will stay clean with minimum care needed.

Such a cover will be attached to the body of the H shaped unit or its related parts so that they all with move simultaneously. Such a cover may have a dome-shaped body, and may have walls around to prevent from open spaces.

Figure 14:
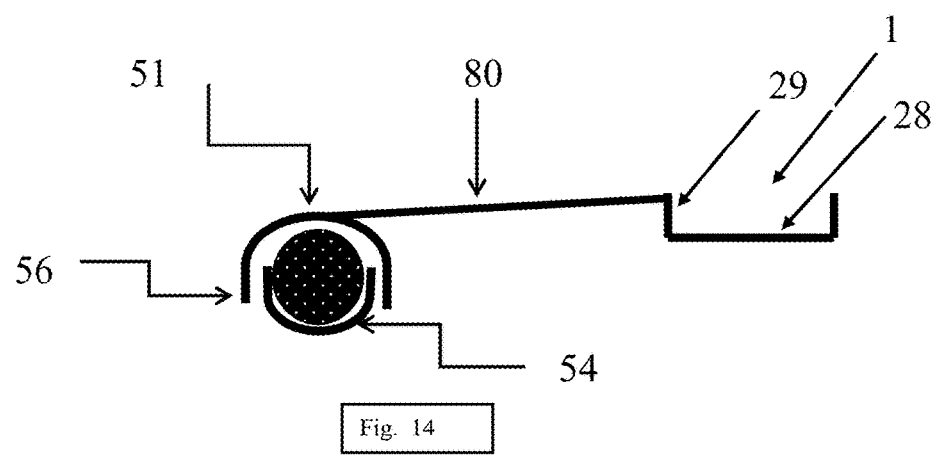
FIG. 14. Shows the cross cut view of the circular means similar to the unit shown at FIG. 13 with the cover sheet shown at 80 which is attached to the upper surface of the circular channel 51 in one side and the inner surface of the vertical side wall 29.

FIG. 14. Shows schematically the cross cut view of the circular means similar to the unit shown at FIG. 13 with the cover sheet shown at 80 which is attached to the upper surface of the circular channel 51 in one side and the inner surface of the vertical side wall 29 from the H shaped channel in the other side leaving no space for the objects to fall in between. The other cover sheets will be made similarly and will leave no space for the object to go through.

Figure 15:
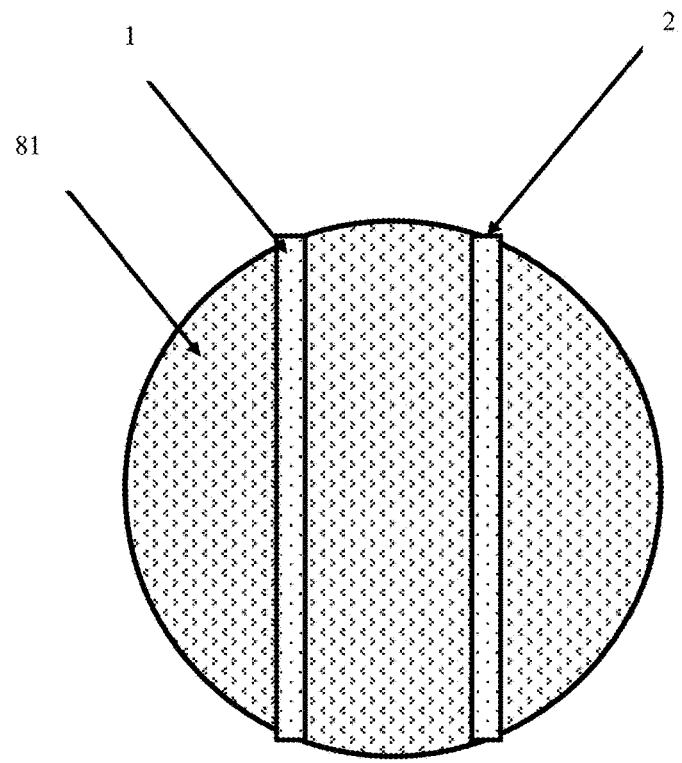
FIG. 15. Shows the top view of an H-shaped unit similar to the unit shown at FIG. 1 except it has a circular cover sheet shown at 81 made from steel.

FIG. 15. Shows schematically the top view of an H-shaped unit similar to the unit shown at FIG. 1 except it has a circular cover sheet shown at 81 made from materials such as steel which is attached to the body of the parallel U-shaped channels 1 and 2 so that there is no open space which an object can go through. Please note the circumference of this circular cover means may have a vertical wall to close the space between the edge of this circular cover and the ground to prevent from objects moving through from the sides as well. Importantly the sidewall which would be vertical will not touch the ground so that the sidewall can turn around freely.

Figure 16:
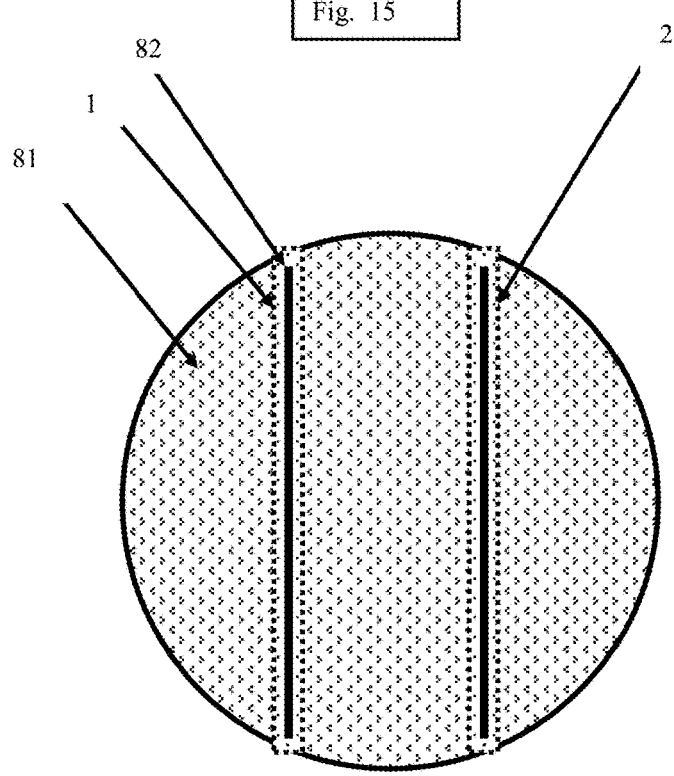
FIG. 16. Shows the top view of a circular cover showed in FIG. 15 except this model shows that the H-shaped unit is standing under this circular cover and it is obscured.

FIG. 16. Shows schematically the top view of a circular cover showed in FIG. 15 except this model shows that the H-shaped unit is standing under this circular cover and it is obscured by the circular cover. Instead one straight line inside represents the line which the center of the tires of the car should go. Such as unit may be modified by using the other means shown in this application such as using the wheels and balls so that there will be only a round flat, sturdy unit which will match the surface of the surrounding area with having a smaller space between these round surface and the surrounding surface so that the automobiles can move easily to the top of this flat surface stand on it and be rotated. Such a unit may have small folding walls in order to stop the car from moving forward when it reaches the proper sites on top of this unit and prevent it from moving forward. These shortfalls will guide the driver to stop the proper area and they will rotate to be flat and allow the vehicle to more over and leave the surface after the rotation.

Figure 17:
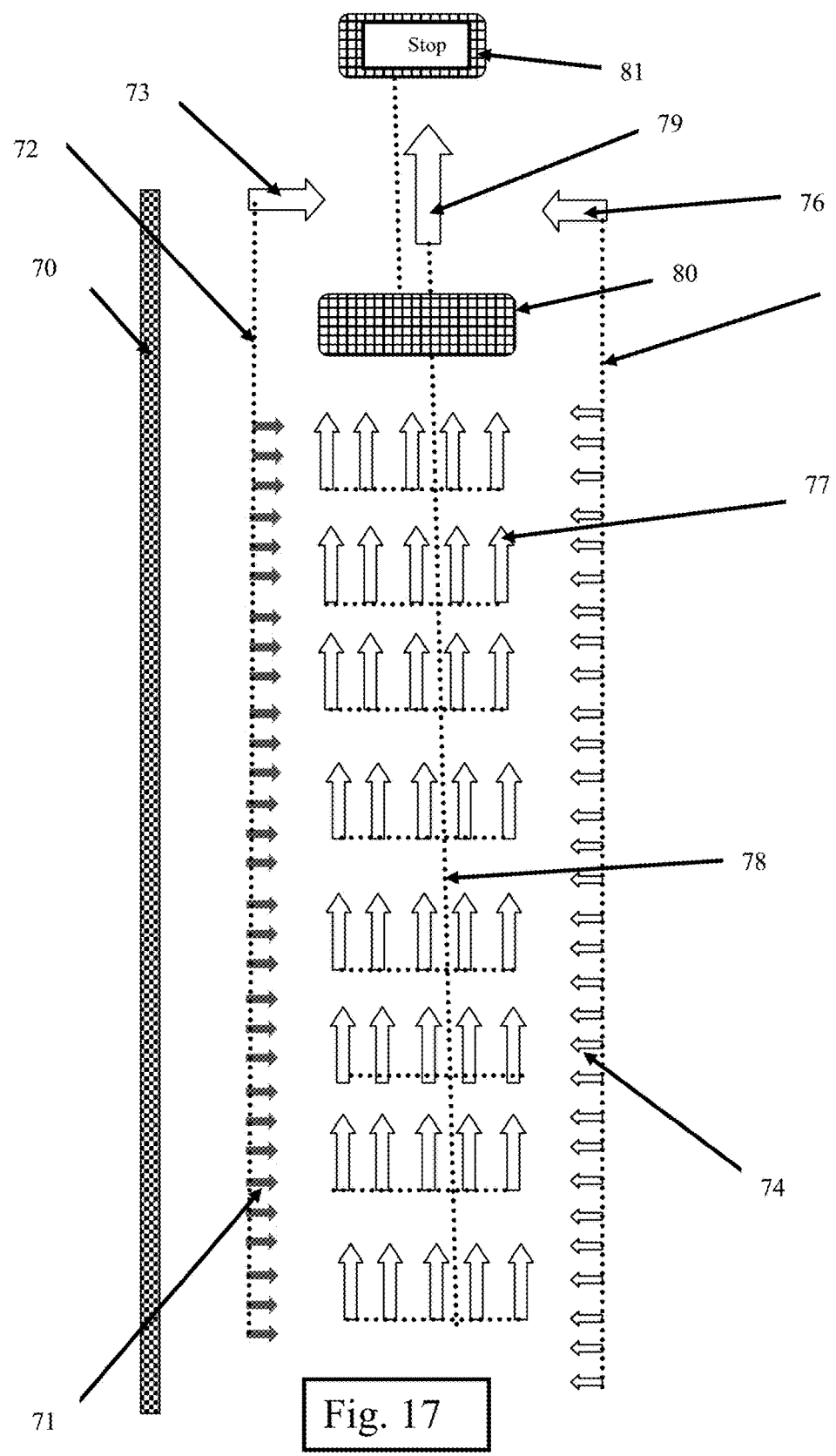
FIG. 17. Shows the top view of a unit which allows the driver of an incoming car to find its path and move in the designed direction.

FIG. 17. Shows schematically the top view of a method and means which allows the driver of an incoming car to find its path and move in the designed direction, in order to align the movement of the tire in a line which they should be. Naturally this issue is important since the car has to stand in the right position compared to the structure under the cover to be safe and the unit to be functional. This method consists of: eee A. A vertical wall or similar in nature shown at 70 which is perpendicular to the surface of the Circular cover showed in FIG. 15 or similar unit. This wall would show the driver to move adjacent to this wall with a distance which will be posted in order for the tires to be in the right path.

B. Another method is shown by a method consisting of

I. A series of forward arrows shown at number 77 so that they show the proper \ which the car has to move in order for the left-side tires to move on top of these forward arrows. These forward arrows are pressure sensitive electrical switches which when pressed by the weight of the tire the electricity connected to them will turn on and it will turn on a lighted large front arrow shown at 79. So that as long as the width of the tire is on top of these arrows the center light will stay on and it would indicate that the tire is moving in the right path.

II. A series of the small left to right arrows are also shown at 71 which are electrically connected to a single large left to right arrow shown at number 73. These small arrows also are a series of pressure sensitive electrical signal and when they are pressed by the weight of tire they will turn on the large left to right arrow 73. Delighted left to right arrow 73 will signal to the driver that the tire is not in the right direction and should be turn to the right in order to fall on path of forward arrows. The light 73 will turn off as soon as the tire leaves the small arrows shown at 71. The mirror image of the small arrows on the left is shown by a series of small right to left arrows one shown 74. These arrows are electrically connected to one single lighted large right to left arrow shown at 76 so that when they are pressed they will turn on the large right arrow 76. When the lighted arrow 76 turns on it indicates to driver that the tire has moved to the right and needs to be turned toward the left in order to fall on the right path shown by the forward arrow. This lighted arrow 76 will turn off as soon as the tire has moved away from the path of small arrows 74 and the light 79 will continue to be on. This method will soon teach the driver of the car to manage the steering wheel and the tires so that the tires to move in the right path shown by its forward arrows and eventually to light the front arrow shown at 79. Therefore this method allows easily the driver to note the right direction and move forward when the front tires will reach its destination after passing the center arrows shown at number 80. When the front tire reaches destination 80 then the light arrow 79 will turn off and the stop sign 81 will turn on. Importantly note, the position, the numbers the colors the switches and other important factors of such method and means will vary depending to the intended use such as, the beats of the tires the numbers of the tires, the size of the whole unit etc.

Also importantly a laser light will be located in front of the rotating floor in order to try to transmit laser waves directed to the mirror located in the middle of the car so that it will be reflected bean that would hit a screen under the laser beam and the reflected light position will show the driver the idea whether he/she should move right or left in order to be in the right line for being in the right position.

Also importantly and alternatively a laser light can be placed front and middle of the window of the car in order to transmit laser beam directed to a mirror located in the middle of a wall in front of the floor in front of the car so that it will be a reflected bean that could be seen so that it direct the driver whether he/she should move right or left in order to be in the right line for being in the right position.

Importantly a model explained in FIG. 16. Can be made to sit in the middle of a flat platform on the ground which has the capacity to host the circular platform as shown in FIG. 16 inside. So that the surface level of both the circular platform and platform around it will match an example of this unit is shown at FIG. 20.

Figure 20:
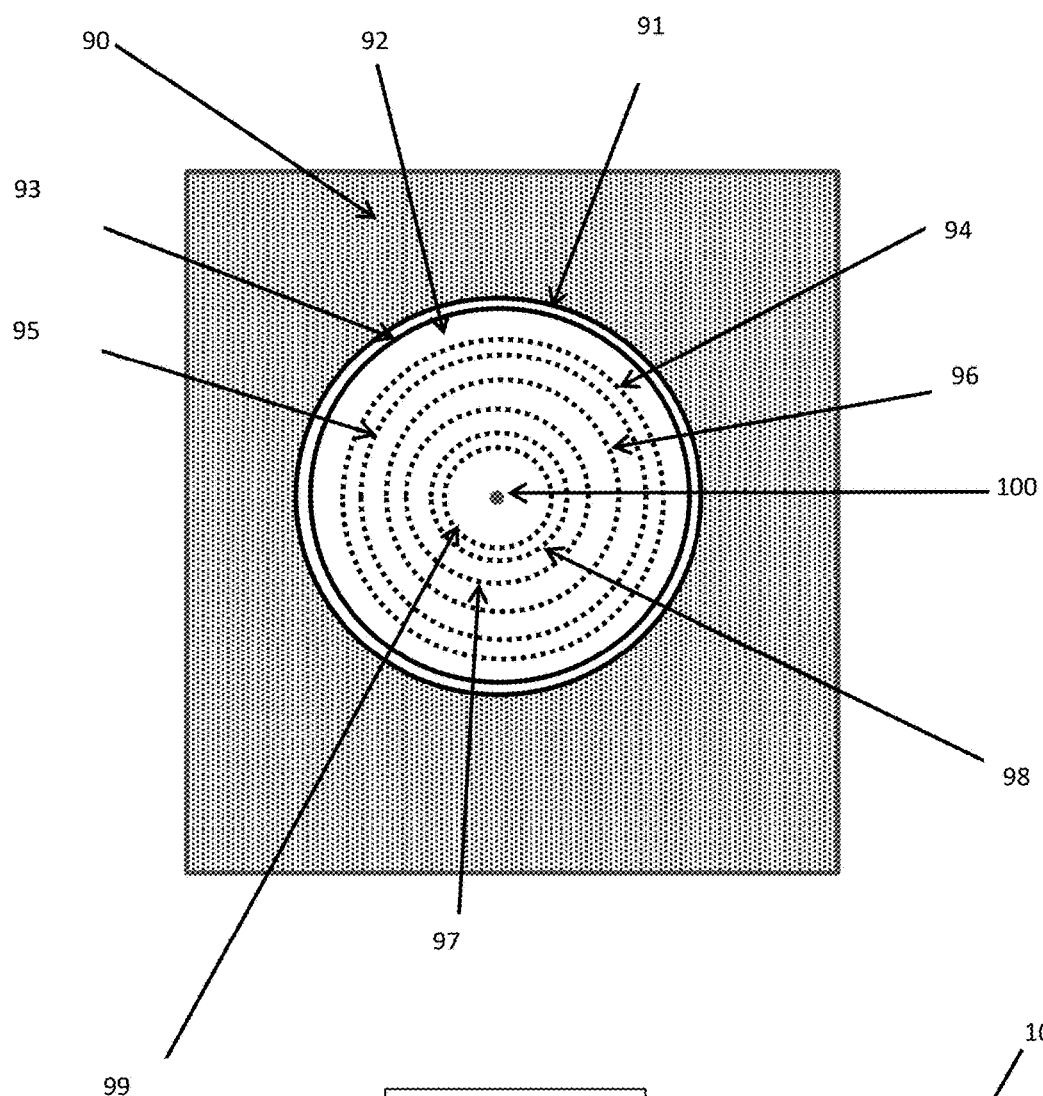
FIG. 20. Shows a unit which has only one, circular flat rotating unit which matches a surrounding platform so that a vehicle can move on top of the central circulating part and be rotated.

FIG. 20. Shows schematically the top view of a circular rotating unit shown at 92 which is located in the middle of a flat platform 90 which is on the ground or similar flat drive way. The circular edge of the platform 90 is shown at 91. And the perimeter of a circular, rotating flat platform unit is shown at 92 and its outer border is shown at 93. Please note for the purpose of illustration in this figure the top body of this rotating circular flat piece is considered to be made from a clear acrylic to allow the units under this surface 92 to be seen and imagined. Please note per design the unit 92 and its components are located on top of a flat, horizontal base made from sturdy, steel which has the capacity of hosting the circular platform and its underlying rotational components. So that the floor of the platform 90 and the upper surface of the rotating, circular platform 92 are in one horizontal level so that it allows an incoming car using platform 90 to move on the top and middle of the circulating platform 92 and to be rotated. This figure also shows schematically a series of U-shaped circular units which consist of an upper and a lower U shaped circular units as shown in FIGS. 10, 13 and 14. These consists of one lower and one upper U shaped circular circles with numbers of matching steal, globes/balls with shiny surfaces designed for allowing the upper U shaped circle to rotate on top of the lower U shaped circle with the minimum friction. Also being capable of tolerating the weight of the surface 92 as well as the car on its top. Please note these circular U Shaped units are schematically shown at 94, 95, 96, 97, 98, and 99 and all are basically similar to units shown at FIGS. 10, 13 and 14 tolerating the weight of the circular unit 92 sitting on the top of the upper U shaped circle 56 of each one of those. Please note the lower wall of the lower U-shaped unit shown at 54 in FIGS. 10 and 14 will be securely situated on upper surface of a sturdy horizontal flat surface made from thick steel, or similar. An electrical engine schematically shown in FIG. 5 at 47 but not shown in this figure will make the surface 92 to rotate per wish by controlling an electrical or an electronic control means. Please note in this figure the upper and lower U-shaped circular units are not shown for the purpose of preventing from a crowded confusing figure. In this design the distance between the inner edge of the floor of the platform 90 and the outer border of the circular rotating platform 92 would be a short distance of about 1 inch allowing the incoming cars to move from platform 90 to the top of the circular platform 92 with ease to be turned around. Importantly the circular rotating platform shown at number 92 will be made to with keeping the up-to-date mechanical science so that it will be strong and sturdy enough to hold the weight of the automobiles which are permitted to be rotated with these units. This surface would not bend under their weight and the whole system will be functional pre purpose. This model of these units will allow the permitted cars to stand on the surface of that circular platform and be rotated even if it is not sitting exactly on surface 92's center. Thus this model will be more forgiving as long as the position of the automobiles on the rotating surface is concerned.

Optionally a series of properly Designed signals will give alarm to driver if the tire of the car has gone beyond the border of the circular platform 92 and is on top of the surrounding platform. These signals will consist of a series of pressure sensitive switches which will be located on the edge of the platform 90 and will turn the electricity on when the tire sits on the top and it would activate an alarm unit/s. This will give the driver the signal that he or she has to relocate the vehicle. This design will allow a car which is not exactly on the center of the platform 92 to be rotated.

Figure 21:
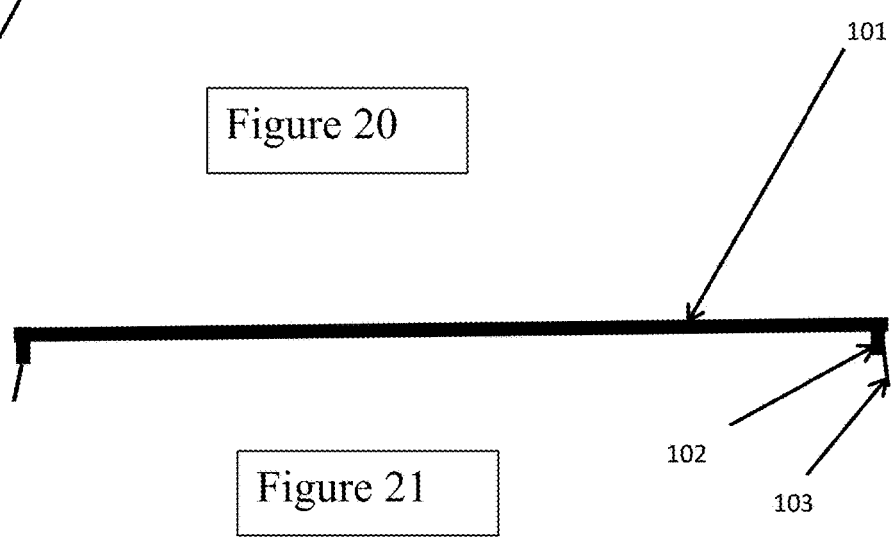
FIG. 21. Shows the cross cut of a flat circular surface which has side walls with brushes at the end to prevent from objects to move inside.

FIG. 21. Shows the cross cut of a flat circular surface shown at 101 which has a vertical side wall all around it and it's cross cut is shown at 102 which may have brushes at the end of the sidewall in order to prevent from objects to move inside. This side wall and the brushes are very important since they would prevent from objects such as papers, leaves, plastics and dirt from moving inside and creating problem with the motion of the unit.

DETAILED EXPLANATION OF THIS INVENTION

Use of automobiles has been part of the modern life. However, many times handling these units are difficult and require extra time and energy. One such conditions is making a U-turn when needed particularly in a narrow driveway, street or the end of a narrow valley or street. In these circumstances commonly the driver ends up with turning the car by multiple back and forth moves or driving backward by turning his/her body and neck and shoulders, which is problematic due to limited vision, limited control of the car as well as neck and shoulder pains. Also it takes more time, uses extra gas, polluting the air, also entering a street driving backward is much more dangerous than driving forward when the vision is significantly more. For these reasons this applicant introduces units which allow a mechanized means to be utilized for rotating a car about 180° in a practically smallest surface possible, so that the driver would not need to drive backward and accept the discomfort and risks. This invention introduces to parallel channels which will be attached to allow them rotate circularly around a circular point so that an automobile can move forward inside these channels. Then the parallel U-shaped channels will rotate around a predesigned center for about 180°. This rotation will then allow the automobile to leave them parallel U-shaped channels and continue its trip. Applicant believes that many times such a unit would decrease the pain and suffering of the drivers, it will decrease the extra gas from being used and related air pollution and will promote a better life. Examples of such units are shown at FIGS. 9, 10 and 1.

FIG. 9. Shows schematically two parallel U-shaped channels shown at 1 and 2 which are attached to the top of a circular means which is capable of allowing them to rotate around the center of the circular means 51. Please also note the cross cut view of the circular means which is shown at FIG. 10. These two circular means consists of two matching circular shaped units which the first one 51 sits on the top of the second circular means 54 located in the bottom. These two circular means are made from a material such as steel. The engineering of these units allows the upper circular means 51 to overlap the lower circular means 54 which also is made from steel and located in the bottom. Between these circular means are multiple globe shaped bearings made from steel with very smooth outer surface which facilitate the movement of the upper circular means 51 compared to the lower circular means 54 without significant resistance, similar to the method used for making ball bearings. Two U shaped straight channels 1 and 2 are attached firmly in parallel situation toward each other and with the exact same distance from the center of the circular means 51-54 to the upper surface of the circular means 51. At the time of use the bottom circular means 54 would be fixed on the ground in a horizontal condition and will be adjusted so that it would be firm on the ground and also in a horizontal situation. Therefore the upper circular means 51 will be also in a horizontal position. Thus this horizontal position will be also translated to the two U-shaped channels 1 and 2. The presence of these two U-shaped channels 1 and 2 will allow a four wheeled automobile to move with its tires on the top of surface of the channels 1 and 2 so that the left tires will be situated on the flat upper surface of the channel 1 and the two right side tires be situated on the upper surface of the channel 2. A vertical pole shown at 55 allows the user to circulate the upper circular means 51 to rotate easily on top of the lower circular means 54 therefore the user is able to rotate the automobile for about 180° easily so that the automobile can make the U-turn with much less effort. This figure also shows an electrical engine which uses a wheel shown at number 58 for rotating the U-shaped circular channel 51. This electrical engine can be controlled by a computerized program or alternatively it may use a manual control such as the unit shown at number 60 which in this case it will start the engine and move the circular channel number 51 when the person to insert a coin or a predesigned ticket inside the slot shown in the control box 60. The movement of the circular shaped channel 51 will stop when the end of channel 2 reaches the proper destination and activates the shutoff unit 59 so that the automobile can leave the unit proper spot. The box 60 and the shutoff unit 59 are electrically attached to each other and controlled by the program which is designed for such function.

FIG. 10. Shows schematically the cross cut side view of the circular unit shown in previous FIG. 9. In this figure the upper U-shaped channel is shown at 51 and the lower U-shaped circular unit is shown at 54 and the ball bearing shown at 53. Please note this design allows the upper U-shaped circular unit 51 to rotate compared to the lower U-shaped circular means 54 when they are in horizontal position. Please also note that importantly per design the lower walls of the upper circular unit shown at 55 and 56 overlap the sidewalls of the lower U-shaped circular means 54. This design will prevent from moving objects and particles to reach the inner space of this unit and the ball, thus when compared to an open space this unit will have far less problems and maintenance.

Another vision of this unit is shown on FIGS. 1, 2 and related figures. In these models a series of wheels are attached to the H shaped channels. One example is shown in FIG. 1. This figure shows an H shaped unit made from two parallel U-shaped channels shown at 1 and 2 which are attached to each other by a connecting piece 3. The U shape figure of these pieces is shown better in FIG. 2. These two parallel pieces are connected to each other by at least one piece shown at 3. Also other pieces of poles or sheets of steel such as units shown in numbers 12 and 13 may be also utilized in order to secure the channels 1 and 2 together firmly. The middle connecting means 3 has a very critical role in this unit since it has a vertical axel 4 going through its center which allows the whole unit to rotate around this axel in a circular fashion. The front and rear ends of the channels 1 and 2 have wheels such as 5, 7, 8 and 9 which have a vertical axis attached to the body of the channels 1 and 2 so that this mechanism allows the H unit to rotate around the center axle 4. Please note the side view of the channel 1 and related vertical axle and the wheel 5 is shown in FIG. 4. Number 6 in this figure shows the position of the vertical axel which connects to the wheel 5. Number 14 and 15 shows an open end of the channels 1 and 2 which allows the front tires of an automobile to enter and move forward on top of the horizontal surface of the channels 1 and 2. A vertical wall shown at 16 may be used to block and will stop the movement of the front wheel beyond this point. A similar block is used in the other side at the end of the U-shaped channel number 1. These vertical blocks will function at will so that by using a horizontal hinge on their base they will open as a gate and let the car to move forward. And they can be closed when another car has to move in and stop.

FIG. 2. shows schematically the side view of the U-shaped channel 1 in the spot which the wheel 5 is attached to it. This figure shows the U-shaped channel consists of a horizontal floor shown at 28 made from a resilient plate made of steel and it has two vertical walls 29 and 30 respectively. Please note the presence of two vertical walls 29 and 30 will allow the tire of a vehicle to be directed and sit inside this U-shaped unit and be stable. In the lower surface of the floor 28 there is a wheel 5 which is connected to the channel 1 by use of a U-shaped bracket 32 and vertical axel 34. The wheel 5 rotates around the horizontal pin 33. The bracket 32 is attached by a vertical pole 34 to the middle of the floor 28 at that point. Please note that the wheels 7, 8 and 9 are similar to the wheel 5 and are attached to the front and rear ends of the U-shaped channels 1 and 2 exactly in the same relative spots thus this method allows the H-shaped unit to rotate on the ground around the central vertical 4 exactly on the same circular route. The piece 3 has a hole which allows a vertical pole 4 to go through so that finally the channels 1 and 2 to rotate around the central axle 4 as designed.

Please note that when used with the parallel channel 2 only the lateral wall 29 may be needed and the medial wall 30 can be eliminated.

FIG. 3. shows schematically the side view of the U-shaped channel 1 shown in previous FIG. 2 which is hosting a front tire shown at number 35, please note that this tire is sitting on the upper surface of the horizontal sheet 28 from the channel number 1 from the H shaped unit shown in FIG. 1. Please note the vertical side walls shown at 29 and 30 will prevent the tire from exiting the upper surface of this channel.

FIG. 4. Shows schematically the side view of the channel 1 which in this view it's vertical rectangular side 30 is shown and the side view of the central pole 4 is shown which attaches to the center of the strong plate 42 which securely attaches to the ground and prevents the pole 4 from moving. Importantly please note that although in this figure it appears the pole 4 is attached to the channel 1 but in fact it is not and it is attached to the plate 3 which is shown in FIG. 1. This figure shows the wheel 5 connected to the lower end of a U-shaped bracket 32 by a pin which goes horizontally from the center of the wheel 5 and allows the wheel 5 to rotate around it. The bracket 32 is attached by a vertical pole 34 to the floor of the channel 1. Also in this figure the wheel 8 is shown which attaches to the rear end of the channel 1 by the same method.

FIG. 5. Shows schematically the front view of the unit shown at FIG. 1. In this view the side views of both Channels 1 and 2 are seen showing their U-shaped body with a horizontal floor shown at 28 and 41 respectively. The channels 1 and 2 have vertical side walls shown at 29 and 30 for the channel 1 and 45 and 44 for the channel 2. Each channel has a front wheel shown at 5 for channel 1 and 7 for channel 2 respectively which are attached to the lower surface of the horizontal floors of these channels shown at 28 and 41 respectively. The side view of the horizontal strong rectangular plate 3 which was shown at FIG. 1 is shown here as well. This unit 3 is made of a strong material such as steel and attaches the center of the medial walls 30 and 45 of the channels 1 and 2 to its own ends. The attachments of the channels 1 and 2 with the connection means 3 makes the H shaped unit. The very center of this rectangular plate 3 has a hole which allows a vertical pole 4 to go through and attach to the center of a strong plate 42. This view also shows two wheels 5 and 7 which are connected to the lower surface of the front of the floor 28 from Channel 1 and 41 from channel 2. Note this mechanism allows the H shaped unit shown in FIG. 1 to rotate around the central pole 4 which attaches to the center of the strong plate 42 which is securely attached to the ground and prevents the pole 4 from moving. This mechanism allows the plate 3 and eventually the channels 1 and 2 to rotate around the center 4 with the least possible variation. Importantly please note in three-dimensional plane the plate 3 is attached to the middle of the length of the channels 1 and 2 which cannot be seen in this view.

Figure 6:
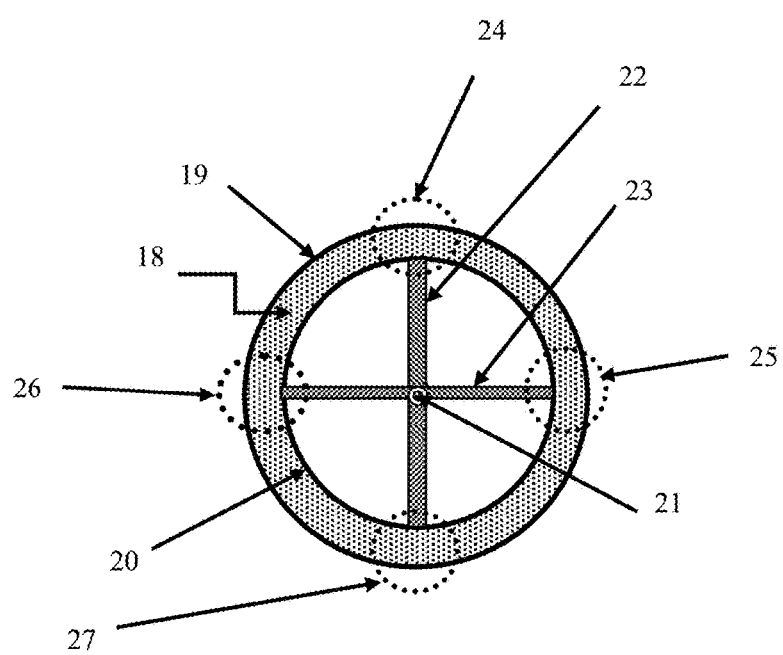
FIG. 6. Shows schematically the top view of a circular channel designed for allowing the H shaped unit shown in FIG. 1 to stand on top of this unit and rotate with ease.

FIG. 6. Shows schematically the top view of a circular channel designed for allowing the H shaped unit shown in FIG. 1 to stand on top of this unit and rotate with ease. Since the H shaped unit shown on FIG. 1 need to be placed in a horizontal, smooth and the sturdy path to be able to rotate properly with ease. For this reason this circular channel is designed and is shown at 18. The center of this circular unit is shown at 21. This circular channel allows the wheels 5, 7, 8 and 9 from the H shaped unit shown at FIG. 1 to sit on the surface of this circular channel and rotate by having the vertical pole number 4 to be fixed exactly in the center 21 of this circular sturdy channel. The outer wall of this circular channel is shown at 19 and the inner wall of the channel is shown at 20. The strong bars 22 and 23 attaches to the inner wall of the circular channel for holding this unit securely in place and prevent it from disfiguring. This figure also shows four circular bases shown at 24, 25, 26, and 27 which are designed to hold the circular channel on the ground and be adjusted, so that the upper surface of the circular unit 18 to stand in a horizontal position for allowing the wheels of the H shape unit shown at FIG. 1 to rotate inside this circular channel easily. The side view of these bases and the related parts are shown in FIG. 7.

FIG. 7. Show schematically the side view of the circular channel 18 shown at FIG. 6. In this figure the outer wall of the channel 18 is shown at 19 and the lower surface of the base of this channel is shown at 18A. This circular channel has four stabilizing adjustment means which only three of them are seen in this figure shown at 26, 27, and 25. This stabilizing adjustment means have a lower relatively flat horizontal body one of them shown at 26 which is attached to the lower surface of the circular channel here shown at 18A by an adjustable pole shown at 30. The adjustable pole 30 and similar units are designed for allowing the level of the base 18A of the unit 18 to be adjusted so that finally the unit 18 to be in a horizontal level in order to allow the wheels of the H shaped unit shown at FIG. 1 to circulate on its upper surface easily. Note the numbers and makeups of such stabilizing units may vary depending to the size of the unit 18 as well as the ground structure which it is to be placed. For example the H shaped unit may be placed directly on the ground if the ground is horizontal, and properly made with smooth concrete surface. Or it may be placed on the ground made of gravel so that it can be adjusted. The final outcome has to make the unit 18 to be horizontal and leveled for use. A channel shaped ramp shown at 33 has a street-level entrance 31 which will stay on the street surface and allow the front wheels of the incoming automobile to move inside and continue to reach the channels 1 and 2 from the H shaped unit. Note the second end of the floor of this channel 33 will match the upper surface of the channel 1 and 2 so that the movement of the automobile from this ramp to the channel 1 and 2 to be possible and smooth. This ramp may be hinged to the body of the circular unit 18 in the proper spot. Note this ramp would be either a wide ramp or consisting of two parallel ramps so that each one will match and allow the wheels of the automobile to move from each one of these ramps to the rear end of the channels 1 or 2.

Multiple electrical or electronic controls may be used in order to allow the movement of the H shaped unit 1 and 2 to be safe for example the control will allow this unit only to rotate when the vehicle is situated on its top, to prevent it from moving if no vehicle is on its top. This is a safety measure to prevent from abuse and accident. Also following units may be used with these units.

A. The H shaped unit may have a vertical pole attached to channels 1 or 2 or both for allowing the H shaped unit to be rotated manually. Such a pole is shown at number 46 at FIG. 4, and FIG. 8A.

B. Electrical engines may be attached directly or indirectly to the wheels such as wheel 5 and or wheels 6, 7 and 8 or even can be independent of these wheels in order to have them rotate electrically. One such example is shown at the unit 47 at FIG. 5 which has a rotating smaller wheel touching the wheel 5 so that the electrical engine will eventually rotate the wheel 5 at the direction desired. These engines will have electrical or electronic control means.

C. The unit may use control means with slots or means for inserting money or tickets in order to start the rotation of the H tape unit, so that the user will participate in the expense of making such units in the city. An example is shown at number 60 at FIG. 9.

FIG. 8. Shows schematically the front view of the channels 1 and 2 with a car moved on its top. The front wheels of the car are sitting in front of the channel 1 and 2. This figure also shows a schematically an electrical engine shown at 46 which has a wheel and will be used to rotate the wheel 5 by its electrical power. This figure is shown for giving an idea of how a car will be positioned on top of the channel 1 and 2.

Figure 8A:
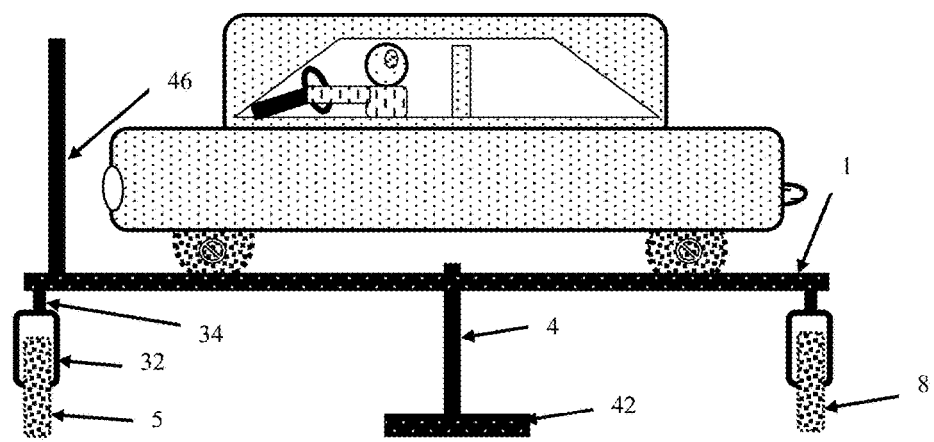
FIG. 8A. Shows the side view of channel 1 can be seen with a car on its top with its left side wheels sitting on channel 1.

FIG. 8A. Show schematically the side view of a unit similar to one shown in FIG. 8. In this figure the side view of channel 1 can be seen with a car on its top with its left side wheels sitting on channel 1. This figure also shows handle 46 which allows the whole unit to be rotated on a circle with the center shown at 4. This figure is also shown to give an idea of how the car will be positioned on top of the channel. Importantly note this size of the channels will be designed to accept various automobiles which will use this unit.

Adjustable Units.

Importantly, this applicant considers the fact that there are different cars on the streets with different sizes some small and some big and the tires of these cars varies for this reason these units are designed to be adjustable as well so that the width of the H shaped unit and its length as well as the width of the channel itself can be adjusted. One such method is shown at FIG. 11 which allows the width of a U-shaped channel to be adjusted.

FIG. 11. Shows schematically the side view of an adjustable U-shaped channel which consists of two matching L shaped pieces which are overlapping their lower surface and are fixed to each other by screw 65. Please note one L shaped piece is made from a horizontal sheet 61 with its vertical wall 62 and the matching part is made from combination of horizontal sheet 63 joined by the vertical part 64. This mechanism allows the width of an H-shaped channel to be adjusted to made it wider for the vehicles which have wider tires and shorter for those automobiles which have narrower tires. Naturally in public places the width of the U-shaped channels would be chosen to be wide to accommodate most of the cars. Importantly also the length of long parts of this H shaped channels can be also made from two or more pieces which will overlap each other and can be attached to each other by means of screws or welding in order to make different size units. This adjustability will allow the length of those pieces to be adjusted and finally a unit will be made to fit the need of the user. FIG. 12. Shows schematically the top view of an adjustable U-shaped channel which consists of two matching U-shaped channels which the first one slides inside the second piece and a series of screws fix them together. Therefore the length of the final unit will be adjusted. In this figure the first channel has the flat surface shown at 66 and two vertical walls shown at 67 and 68. The second U-shaped channel is shown at 69 with vertical walls 70 and 71. The screw 72 allows these two units to be fixed to each other. Therefore, the methods shown at FIGS. 11 and 12 allow the width and length of a U-shaped channel to be adjustable. A similar unit will allow the middle attachment unit shown at 3 and other pieces in FIG. 1 to be adjustable as well. Also note importantly, the wheels and movement parts of the unit shown in these models can be made from one or more series of ball bearings and similar so that the friction in the moving parts will be as little as possible and the movements of the parts of these units to use the least energy possible.

Importantly, the unit may have a cover made from sheet of steel in order to cover the spaces between them H shaped unit and circular unit in order to prevent from objects falling under this cover and in order to make it safe for the pedestrians to walk over all children to play between the H shaped channels and run into accidents. Such a cover may have a dome-shaped body or it may have walls around to prevent from open spaces. Such a cover rear will shield this unit from moving objects such as tree leaves, papers and similar which to be in the may bring and leave. Such a cover will be attached to the body of the H shaped unit or its related parts so that they own may move simultaneously. In the case of circular unit shown at FIGS. 9 and 10 the covers may be fixed around the circle. FIG. 13. Shows schematically the top view of a circular means similar to the unit shown at FIG. 9 except in this model a cover sheet made of steel shown at 80 is being attached to the inner wall 52 and it also attaches to the sides of the H shaped channel in order to cover the spaces between the H shaped unit and circular unit for preventing from objects falling under this cover. The purpose of making such covers are:

1. For making the unit safe for the pedestrians who may walk in the area which this unit is installed. It will prevent children to play between the H shaped channels and run into accidents.

2. This unit will shield this unit from moving objects such tree leaves, papers and other particles from moving's in spaces between the H shaped units. Therefore it will stay clean with minimum care needed.

Such a cover will be attached to the body of the H shaped unit or its related parts so that they all with move simultaneously. Such a cover may have a dome-shaped body, and may have walls around to prevent from open spaces.

FIG. 14. Shows schematically the cross cut view of the circular means similar to the unit shown at FIG. 13 with the cover sheet shown at 80 which is attached to the upper surface of the circular channel 51 in one side and the inner surface of the vertical side wall 29 from the H shaped channel in the other side leaving no space for the objects to fall in between. The other cover sheets will be made similarly and will leave no space for the object to go through.

FIG. 15. Shows schematically the top view of an H-shaped unit similar to the unit shown at FIG. 1 except it has a circular cover sheet shown at 81 made from materials such as steel which is attached to the body of the parallel U-shaped channels 1 and 2 so that there is no open space which an object can go through. Please note the circumference of this circular cover means may have a vertical wall to close the space between the ages of this circular cover and the ground to prevent from objects moving through from the sides as well. Importantly the sidewall which would be vertical will not touch the ground so that the sidewall can turn around freely.

FIG. 16. Shows schematically the top view of a circular cover showed in FIG. 15 except this model shows that the H-shaped unit is standing under this circular cover and it is obscured by the circular cover. Instead one straight line represents the line which the center of the tires of the car should go.

FIG. 17. Shows schematically the top view of a method and means which allows the driver of an incoming car to find its path and move in the designed direction, in order to align the movement of the tire in a line which they should be. Naturally this issue is important since the car has to stand in the right position compared to the structure under the cover to be safe and the unit to be functional. This method consists of:

A. A vertical wall or similar in nature shown at 70 which is perpendicular to the surface of the Circular cover showed in FIG. 15 or similar unit. This wall would show the driver to move adjacent to this wall with a distance is shown in order for the tires to be in the right path.

B. Another method is shown by a method consisting of
  I. A series of forward arrows shown at number 77 so that they show the proper path which the car has to move in order for the left-side tires to move on top of these forward arrows. These forward arrows are pressure sensitive electrical switches which when pressed by the weight of the tire the electricity connected to them will turn on and it will turn on a lighted large front arrow shown at 79. So that as long as the width of the tire is on top of these arrows the center light will stay on and it would indicate that the tire is moving in the right path.
  II. A series of the small left to right arrows are also shown at 71 which are electrically connected to a single large left to right arrow shown at number 73. These small arrows also are a series of pressure sensitive electrical signal and when they are pressed by the weight of tire they will turn on the large left to right arrow 73. Delighted left to right arrow 73 will signal to the driver that the tire is not in the right direction and should be turn to the right in order to fall on path of forward arrows. The light 73 will turn off as soon as the tire leaves the small arrows shown at 71. The mirror image of the small arrows on the left is shown by a series of small right to left arrows one shown 74. These arrows are electrically connected to one single lighted large right to left arrow shown at 76 so that when they are pressed they will turn on the large right arrow 76. When the arrow 76 turns on it indicates to the driver that the tire has moved to the right and needs to be turned toward the left in order to fall on the right path shown by forward arrow. This lighted arrow 76 will turn off as soon as the tire has moved away from the path of small arrows 74 and the light 79 will continue to be on. This method will soon teach the driver of the car to manage the steering wheel and the tires so that the tires to move in the right path shown by its forward arrows and eventually to light the front arrow shown at 79. Therefore this method allows easily the driver to note the right direction and move forward when the front tires will reach its destination after passing the center arrows shown at number 80. When the front tire reaches destination 80 then the light arrow 79 will turn off and the stop sign 81 will turn on.

Importantly note, the position, the numbers the colors the switches and other important factors of such method and means will vary depending to the intended use such as, the beats of the tires the numbers of the tires, the size of the whole unit etc.

Importantly, note that numbers of the columns of arrows shown in the sides may be more than one column in each side in order to make the surface which they cover to be wider, and their size and shape may wary. The pressure sensitive switch may be made in various forms and shapes the idea is to make a suitable unit which will turn of when is not pressed and will be turned on when pressure is applied to the switch.

Figure 18:
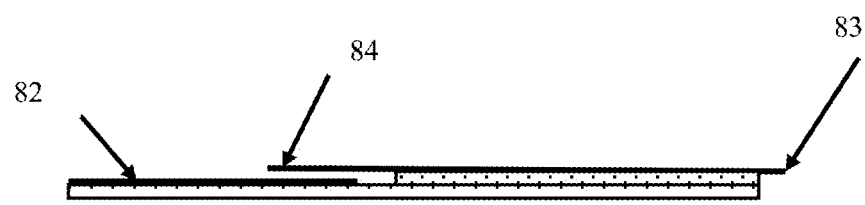
FIG. 18. Shows a pressure sensitive means which allows a light to turn on when pressure is applied to the top of its designated area shown at point 84.

A pressure sensitive means is shown on FIG. 18 electricity connects to the cable at 82 and is separated from another cable 83 at point 84 the piece 84 is a conductive spring piece when pressure applies to point 84 two electrical cables will be connected to each other and electricity will go through and the attached light will turn on.

Importantly, the unit for rotating the cars may be made to consist of two parallel units to be used in places such as mid line of a street which it will allow a first car to make a U-turn from one side and the second car from the other side to make a U turn too simultaneously. Therefore with one movement two cars can make a U turn simultaneously helping in traffic significantly. Also importantly should be noticed that these units may be used in tunnels or narrow roads and similar places which a U-turn would be needed due to accident or blockage of the roads. These units may be also made to be transportable so that they can be towed to places which are needed due to a sudden need. All these and many other circumstances may occur which the use of these units will be needed.

Means for Directing the Cars to the Designated Lines or Areas.

For this purpose various means and methods may be used such as:
  Color coded lines.
  Electrical lines and signals.
  Various shaped walls and similar.
  Use of mirrors.
  Laser Beams.
  Use of video camera And any other means may be used in order to direct the incoming cars to move in proper direction and have its tires to be in the proper lines which are designed to be.

Also importantly various forms, shapes, sizes and combinations of wheels and ball bearings may be used singularly or in combination in order to make the movements of these units and their parts to be simpler with the least energy consumption.

One or more manual, electrical or electronic controls may be used alone or in combination in order to allow the movement of these units to be safe for example the control will allow this unit only to rotate when the vehicle is situated on top of this H shaped unit so that it will not move freely of its own if there is no vehicle situated on its top. This is a safety measure to prevent from a pedestrian to be hit by this unit if it moves accidentally. Also the following units may be used with these units.

A. The unit may have the vertical pole attached to one or more channels such as channels 1 or 2 or both for allowing the H shaped unit to be rotated manually. Such a pole is shown at number 46 at FIG. 4.
B. Also guides' such as soft, moveable walls or ropes may be used to guide the incoming cars to move in right direction
C. Electrical engines may be attached directly or indirectly to the wheels such as wheel 5 and or the other similar wheels such as 6, 7 and 8 or even can be independent of these wheels in order to have them rotate electrically. One such example is shown at the unit 46 which has a rotating smaller wheel attaching to the wheel 5 so that the electrical engine of this unit will eventually rotate the wheel 5 and the direction desired. These engines will have electrical or electronical control means.
D. The control units may be made with slots or means for inserting money or tickets in order to start the rotation of the H tape unit, so that the user will participate in the expense of making such units in the city.

Importantly, the size, the shape, the relative sizes of different components of these units and their important parts may vary to make different units and models.

Figure 19:
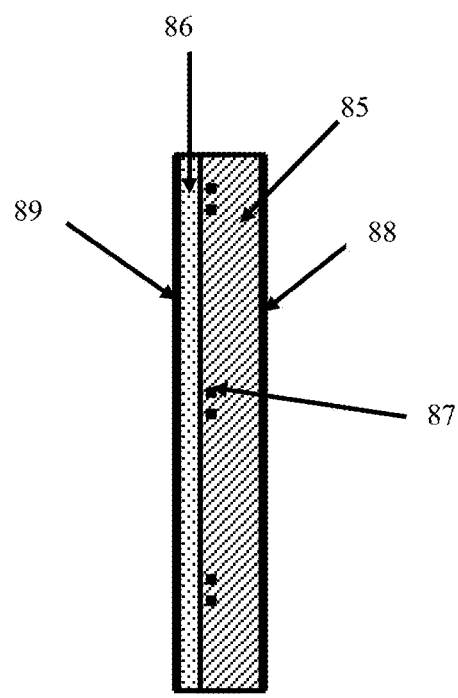
FIG. 19. Shows method of adjusting the width of the H shaped unit and similar by screwing two matching pieces together.

FIG. 19. Shows a schematically a method and means which allows the unit shown at 1 and 2 in FIG. 13 and similar to be adjusted so that the width of these parts can be adjusted. In this method two long L-shaped units shown at 85 and 86 have overlapping segments which are screwed to each other by screws shown at 87 and similar for making the channels. So that by moving one of these segments laterally and screwing them to each other to have a wider path or channels for the wheels made, and this method will provide more options for such use. Also please note that horizontal pieces which attach to these vertical units can be also attached on an adjustable basis as well providing more options. The walls 88 and 89 are attached vertically to the sides of the flat sheets 85 and 86 for making and L-shaped units and eventually will prevent the wheels from falling to sides.

Importantly a model explained in FIG. 16. Can be made to sit in the middle of a flat platform on the ground which has the capacity to host the circular platform as shown in FIG. 16 inside. So that the surface level of both the circular platform and platform around it will match an example of this unit is shown at FIG. 20.

FIG. 20. Shows schematically the top view of a circular rotating unit shown at 92 which is located in the middle of a flat platform 90 which is on the ground or similar flat drive way. The circular edge of the platform 90 is shown at 91. And the perimeter of a circular, rotating flat platform unit is shown at 92 and its outer border is shown at 93. Please note for the purpose of illustration in this figure the top body of this rotating circular flat piece is considered to be made from a clear acrylic to allow the units under this surface 92 to be seen and imagined. Please note per design the unit 92 and its components are located on top of a flat, horizontal base made from sturdy, steel which has the capacity of hosting the circular platform and its underlying rotational components. So that the floor of the platform 90 and the upper surface of the rotating, circular platform 92 are in one horizontal level so that it allows an incoming car using platform 90 to move on the top and middle of the circulating platform 92 and to be rotated. This figure also shows schematically a series of U-shaped circular units which consist of an upper and a lower U shaped circular units as shown in FIGS. 10, 13 and 14. These consists of one lower and one upper U shaped circular circles with numbers of matching steal, globes/balls with shiny surfaces designed for allowing the upper U shaped circle to rotate on top of the lower U shaped circle with the minimum friction. Also being capable of tolerating the weight of the surface 92 as well as the car on its top. Please note these circular U Shaped units are schematically shown at 94, 95, 96, 97, 98, and 99 and all are basically similar to units shown at FIGS. 10, 13 and 14 tolerating the weight of the circular unit 92 sitting on the top of the upper U shaped circle 56 of each one of those. Please note the lower wall of the lower U-shaped unit shown at 54 in FIGS. 10 and 14 will be securely situated on upper surface of a sturdy horizontal flat surface made from thick steel, or similar. An electrical engine schematically shown in FIG. 5 at 47 but not shown in this figure will make the surface 92 to rotate per wish by controlling an electrical or an electronic control means. Please note in this figure the upper and lower U-shaped circular units are not shown for the purpose of preventing from a crowded confusing figure. In this design the distance between the inner edge of the floor of the platform 90 and the outer border of the circular rotating platform 92 would be a short distance of about 1 inch allowing the incoming cars to move from platform 90 to the top of the circular platform 92 with ease to be turned around. Importantly the circular rotating platform shown at number 92 will be made to with keeping the up-to-date mechanical science so that it will be strong and sturdy enough to hold the weight of the automobiles which are permitted to be rotated with these units. This surface would not bend under their weight and the whole system will be functional pre purpose. This model of these units will allow the permitted cars to stand on the surface of that circular platform and be rotated even if it is not sitting exactly on surface 92's center. Thus this model will be more forgiving as long as the position of the automobiles on the rotating surface is concerned. Optionally a series of properly Designed signals will give alarm to driver if the tire of the car has gone beyond the border of the circular platform 92 and is on top of the surrounding platform. These signals will consist of a series of pressure sensitive switches which will be located on the edge of the platform 90 and will turn the electricity on when the tire sits on the top and it would activate an alarm unit/s. This will give the driver the signal that he or she has to relocate the vehicle. This design will allow a car which is not exactly on the center of the platform 92 to be rotated.

FIG. 21. Shows the cross cut of a flat circular surface shown at 101 which has a vertical side wall all around it and it's cross cut is shown at 102 which may have brushes at the end of the sidewall in order to prevent from objects to move inside. This side wall and the brushes are very important since they would prevent from objects such as papers, leaves, plastics and dirt from moving inside and creating problem with the motion of the unit.

The invention claimed is:

1. A rotator for rotating a vehicle, the rotator comprising:
a platform having a first and second wheel well, each wheel well having a supporting wheel on an underside of each distal end, and a frame connector connecting a central portion of each of the first and second wheel well, the platform configured to support a vehicle placed on a top surface of the platform;
a support base having a central base and an extruding hub from the base configured to communicate with the frame connector of the platform; and
a turning arm configured to communicate with the platform and to rotate the platform relative to the central support;
wherein each supporting wheel is configured to support a portion of the weight of the vehicle,
wherein the rotation is configured to reorient the vehicle.

2. The rotator for rotating a vehicle of claim 1, wherein the turning arm is configured to be turned manually.

3. The rotator for rotating a vehicle of claim 1, further comprising: an electrical motor configured to communicate with at least one supporting wheel and to apply a force to rotate the platform.

4. The rotator for rotating a vehicle of claim 1, further comprising: a pressure sensor configured to activate a light when pressure is detected.

5. The rotator for rotating a vehicle of claim 1, wherein each wheel well has an adjustable width.

6. A rotator for rotating a vehicle, the rotator comprising:
a platform having a first and second wheel well, each wheel well having an lateral extended portion, and a frame connector connecting a central portion of each of the first and second wheel well, the platform configured to support a vehicle placed on a top surface of the platform;
a support base having a number of rotators distributed around a perimeter of the support base, each rotator configured to communicate with an underside portion of each lateral extended portion of the first and second wheel wells and to support the vehicle; and
a turning arm configured to communicate with the platform and to rotate the platform relative to the support base;
wherein each rotator is configured to support a portion of the platform, and
wherein the rotation is configured to reorient the vehicle.

7. The rotator for rotating a vehicle of claim 6, wherein the lateral extended portions are configured to prevent debris from entering the support base.

8. The rotator for rotating a vehicle of claim 6, wherein the rotators are ball bearings.

9. The rotator for rotating a vehicle of claim 6, wherein the turning arm is configured to be turned manually.

10. The rotator for rotating a vehicle of claim 6, further comprising: an electrical motor configured to communicate with at least one rotator and to apply a force to rotate the platform.

11. The rotator for rotating a vehicle of claim 6, further comprising: a pressure sensor configured to activate a light when pressure is detected.

12. The rotator for rotating a vehicle of claim 6, wherein each wheel well has an adjustable width.

* * * * *